United States Patent
Sirkka

(10) Patent No.: US 9,623,584 B2
(45) Date of Patent: Apr. 18, 2017

(54) FIREWOOD PROCESSOR WITH A TIGHTENABLE SAW CHAIN

(71) Applicant: Maaselan Kone Oy, Haapajarvi (FI)

(72) Inventor: Matti Sirkka, Kangashakki (FI)

(73) Assignee: MAASELAN KONE OY, Haapajarvi (FI)

( * ) Notice: Subject to any disclaimer, the term of this patent is extended or adjusted under 35 U.S.C. 154(b) by 26 days.

(21) Appl. No.: 14/685,523

(22) Filed: Apr. 13, 2015

(65) Prior Publication Data

US 2015/0290831 A1    Oct. 15, 2015

(30) Foreign Application Priority Data

Apr. 14, 2014 (FI) ..................................... 20145354

(51) Int. Cl.
*B27L 7/06* (2006.01)
*B27B 17/14* (2006.01)
(Continued)

(52) U.S. Cl.
CPC .............. *B27L 7/06* (2013.01); *B27B 17/14* (2013.01); *B27L 7/00* (2013.01); *B27B 17/0058* (2013.01); *B27G 19/003* (2013.01)

(58) Field of Classification Search
CPC . B27B 17/0058; B27B 17/0083; B27B 17/02; B27B 17/08; B27B 17/083;
(Continued)

(56) References Cited

U.S. PATENT DOCUMENTS 3,862,651 A * 1/1975 Heikkinen ................ B27L 7/00
                                                  144/194
4,284,112 A    8/1981 Hoskin
(Continued)

FOREIGN PATENT DOCUMENTS

DE    102009014861 A1    11/2010
DE    202013000344 U1    2/2013
WO       2011155880 A1    12/2011

OTHER PUBLICATIONS

Extended European Search Report received for European Patent Application No. EP15397513.1, dated Sep. 21, 2015, 6 pages.

*Primary Examiner* — Matthew G Katcoff
(74) *Attorney, Agent, or Firm* — Ziegler IP Law Group, LLC

(57) ABSTRACT

A firewood processor with a tightenable saw chain, which processor comprises a frame arranged to support the firewood processor to a base, such as the ground, and a saw for sawing wood raw material in a transverse direction into an intermediate product of a desired length. The saw comprises a saw chain, a flange for guiding said saw chain and a sprocket, which is arranged to convey the driving force to said saw chain. The firewood processor further comprises a splitting section for splitting the intermediate product of a desired length in the longitudinal direction into a desired size, which splitting section comprises a splitting wedge and means for splitting the intermediate product of a desired length by means of the splitting wedge. In addition, the firewood processor comprises automatic means for tightening the saw chain of said saw and for maintaining the tightness.

12 Claims, 6 Drawing Sheets

(51) Int. Cl.
*B27L 7/00* (2006.01)
*B27G 19/00* (2006.01)
*B27B 17/00* (2006.01)

(58) Field of Classification Search
CPC ......... B27B 17/086; B27B 17/10; B27L 7/00; B27L 7/06
USPC .................................................. 144/4.6, 366
See application file for complete search history.

(56) References Cited

U.S. PATENT DOCUMENTS 7,228,881 B1    6/2007   Smith
2014/0106915 A1*   4/2014   Kistler .................... B27B 17/14
                                                                     474/111

* cited by examiner

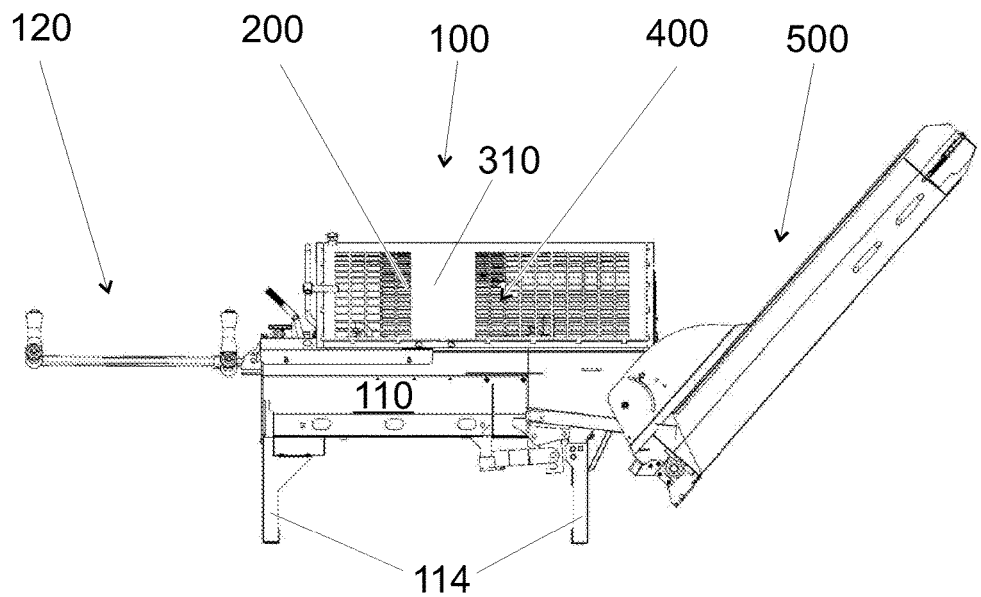
Fig. 1a
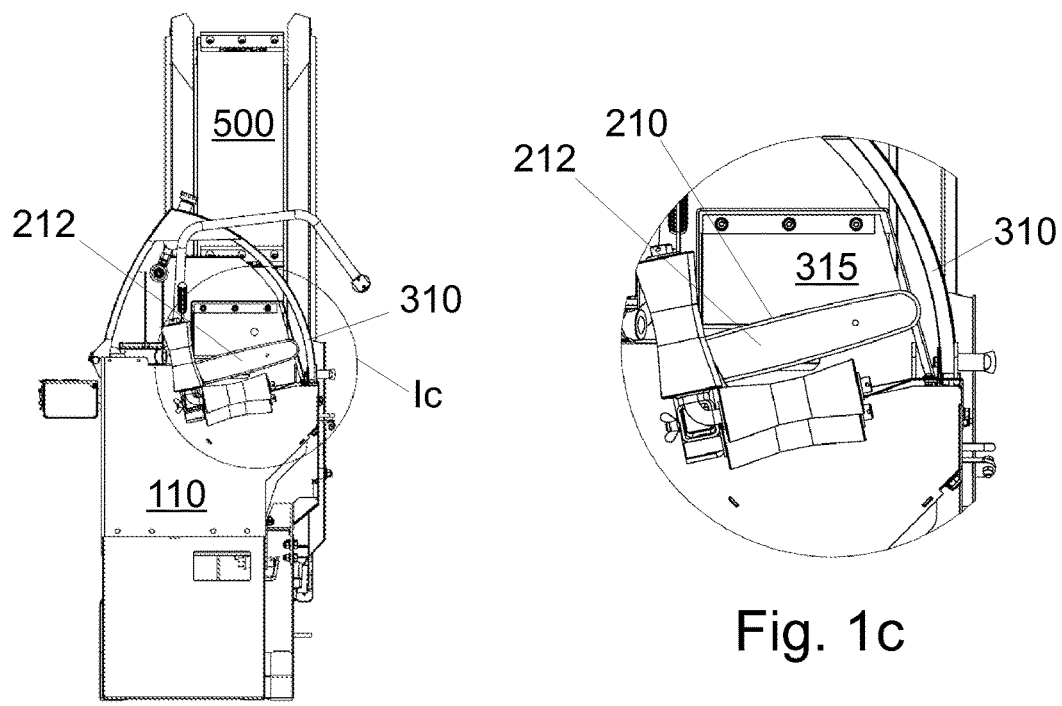
Fig. 1b
Fig. 1c

FIREWOOD PROCESSOR WITH A TIGHTENABLE SAW CHAIN

FIELD OF THE INVENTION

The invention relates to firewood processors, which are used to make firewood by cutting and then splitting tree trunks into suitable size. The invention relates to such firewood processors, where sawing is implemented by a saw chain.

BACKGROUND OF THE INVENTION

In forestry, typically a part of wood raw material is used as saw timber, which is used for making boards and planks at a sawmill. In addition to this, a part of the wood raw material, such as thinning waste, as well as tree tops and branches are utilized as firewood. When making firewood, the wood raw material is sawn and split. For firewood, which is classified as solid biofuel, there exists a standard EN 14961-5, which defines different classes for firewood. In class A, for example, the cutting surface must be even and 90% of the wood must be split.

For handling wood raw material there are known different cutting and splitting machines and as the most advanced machine, a firewood processor where these functions are combined. A firewood processor comprises a saw section for sawing wood raw material and a splitting section for splitting the sawn wood raw material. A firewood processor may comprise conveyors, for conveying, for example, a log or a pole being machined or the finished chips (i.e. chopped wood).

Some firewood processors use a saw that comprises a saw chain. When using this type of a firewood processor the saw cutter (i.e. saw chain) loosens. A cutter that is too loose cuts wood in a bad position, which results in it blunting quickly. Sawing with a blunt cutter wears the cutter and slows down the sawing. When the saw chain wears, it may eventually break. The saw cutter must be tightened every once in a while in order to ensure proper operation of the saw.

Typically the saw chain is tightened by hand by loosening the securing bolts of the saw chain flange, by moving the saw chain flange and by tightening the saw chain flange into its place. Tightening the cutter causes a pause in work and thus slows the working down. Tightening by hand is done only from time to time, in which case the cutter has an optimum tightness only just after it has been tightened and it begins to loosen directly after this. Thus, the cutter becomes blunt more quickly than a cutter that has the appropriate tightness.

BRIEF SUMMARY OF THE INVENTION

The purpose of the present invention is to provide a firewood processor where the saw cutter is adjusted automatically to the correct tightness. On one hand, this increases efficiency, since work does not need to be paused in order to tighten the cutter. On the other hand, this increases the service life of the saw chain, because a cutter with an appropriate tightness wears slower. In order to avoid the above-identified problems the present firewood processor comprises automatic means for tightening a saw chain and for maintaining the tightness. The firewood processor according to the invention is described in the independent claim 1. In an embodiment, a firewood processor comprises
a frame, which is arranged to support the firewood processor to a base, such as the ground,
a saw for sawing wood raw material in the transverse direction into an intermediate product of a desired length, which saw comprises
a saw chain,
a flange for guiding said saw chain and
a sprocket, which is arranged to convey driving force to said saw chain and
a splitting section for splitting the intermediate product of a desired length into a desired size in the longitudinal direction, which splitting section comprises
a splitting wedge and
means for splitting the intermediate product of a desired length by means of the splitting wedge, as well as
automatic means for tightening the saw chain of said saw and for maintaining the tightness.

Some preferred embodiments will be presented in the dependent claims.

DESCRIPTION OF THE DRAWINGS

In the following, the invention will be described in more detail with reference to the appended figures, in which
FIG. 1a shows a firewood processor seen from the front,
FIG. 1b shows a firewood processor according to FIG. 1a seen from the end,
FIG. 1c shows part 1c of FIG. 1b in more detail.

DETAILED DESCRIPTION OF THE INVENTION

Figure 1D:
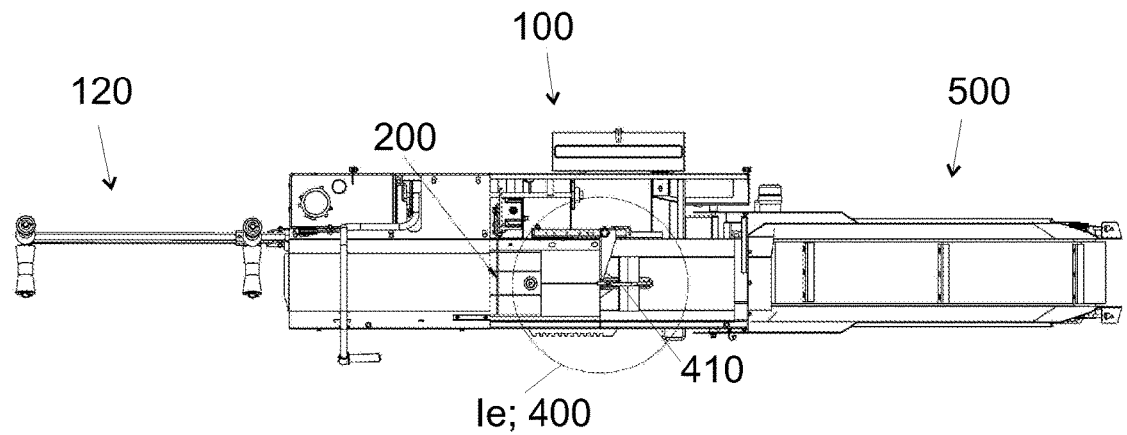
FIG. 1d shows a firewood processor according to FIG. 1a seen from above, with the saw cover removed.

FIG. 1a shows a firewood processor 100 seen from the front. The firewood processor 100 according to an embodiment is suitable for producing firewood according to standard EN 14961-5. The firewood processor 100 according to an embodiment is suitable for producing class A firewood according to said standard. In class A, inter alia, the cutting surface must be even and 90% of the wood must be split.

The firewood processor 100 comprises a frame 110, which is arranged to support the firewood processor to a base, such as the ground. In FIG. 1 the frame of the firewood processor is supported to the ground by means of runners 114. The firewood processor may also comprise wheels, by means of which the firewood processor is supported to the ground. Because of the wheels the firewood processor is easy to move from one place to another. The firewood processor comprises means 120 for feeding wood raw material to a saw 200 in the firewood processor. The term "wood raw material" refers to raw material, from which firewood is made by sawing and splitting. In FIG. 1*a* the saw 200 remains behind a saw cover 310 and is therefore not visible, but the location of the saw 200 is illustrated in FIG. 1*a*.

By means of the saw 200 of the firewood processor the wood raw material is sawn in the transverse direction of the wood, in which case an intermediate product of a desired length is produced. The intermediate product may be, for example, a log, i.e. a relatively short, unsplit wood. The length of the wood raw material is typically some meters, such as 1 m to 10 m, for example, 1.2 m to 5 m, such as 1.5 m-3 m. The desired length of the intermediate product is between 10 cm and 1 m, but typically, for example, 25 cm, 33 cm, 40 cm, 50 cm or 60 cm. The term "transverse direction" refers to a direction that is transverse in relation to the longitudinal direction of the wood, i.e. its fiber direction. Since the wood raw material will be sawn and correspondingly the intermediate product typically will not be sawn, firstly the length of the intermediate product is typically shorter than that of the wood raw material, and further, the length of the final product is the same as the length of the intermediate product.

The firewood processor 100 comprises a saw 200, which is arranged to saw said wood raw material into an intermediate product of a desired length. The structure of the saw 200 is described more in detail later.

Figure 1E:
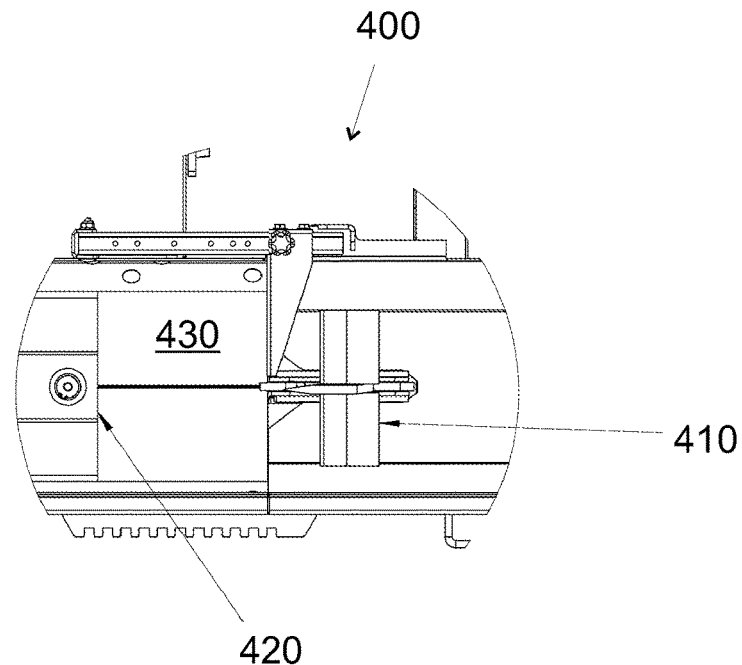
FIG. 1e shows part 1e of FIG. 1d in more detail.

With reference to FIGS. 1*a*, 1*d* and 1*e*, the firewood processor 100 further comprises a splitting section 400 for splitting said intermediate product of a desired length in the longitudinal direction. The term "longitudinal direction" refers to the direction that is in the longitudinal direction of the wood, i.e. parallel to the axis of the growth rings of the tree. In FIG. 1*a* the splitting section 400 remains behind the saw cover 310 and is therefore not visible, but the location of the splitting section 400 is illustrated.

FIG. 1*d* shows a firewood processor seen from above, with the saw cover 310 removed. FIG. 1*e* shows the splitting section 400 of FIG. 1*d* in detail, seen from above. The splitting section 400 comprises a splitting wedge 410. The splitting section 400 further comprises means for splitting said intermediate product of a desired length by means of a splitting wedge 410. The splitting section 400 may comprise, for example, means 420 for pushing said intermediate product of a desired length (such as short wood) towards said splitting wedge 410 and/or means for pushing said splitting wedge 410 towards said intermediate product.

This type of means may comprise a hydraulic cylinder, which is used to move the splitting wedge 410 and/or the intermediate product towards each other. Said intermediate product of a desired length may be arranged in a space 430 between the splitting wedge 410 and the wood pushing means 420 (FIG. 1*e*). Advantageously only one (the intermediate product or the wedge 410) is moved while the other is supported to the firewood processor 100. The wedge 410 and/or the wood are pushed long enough for the wood to split. Advantageously the wood (i.e. the intermediate product) is pushed towards the splitting wedge 410. Thus, the firewood processor comprises means 420 for pushing said intermediate product of a desired length (such as short wood) towards said splitting wedge 410.

Typically the means used in the splitting produce a force that is used to push the wood to the wedge 410 (or vice versa), which force is, for example, 10 kN to 500 kN, such as 20 kN to 100 kN, for example 30 kN to 80 kN. With this type of force the wood can usually be split in the splitting section 400, and to be more exact, in its space 430 (FIG. 1*e*).

With reference to FIG. 1*a*, the splitting machine 100 may further comprise means 500 for moving the split wood (i.e. the final product). The means 500 may be arranged to lift the final product to, for example, at least 1.5 meters, advantageously at least 2 meters, wherein the final product, i.e. firewood may be automatically loaded to, for example, a platform for onward transport.

Figure 2:
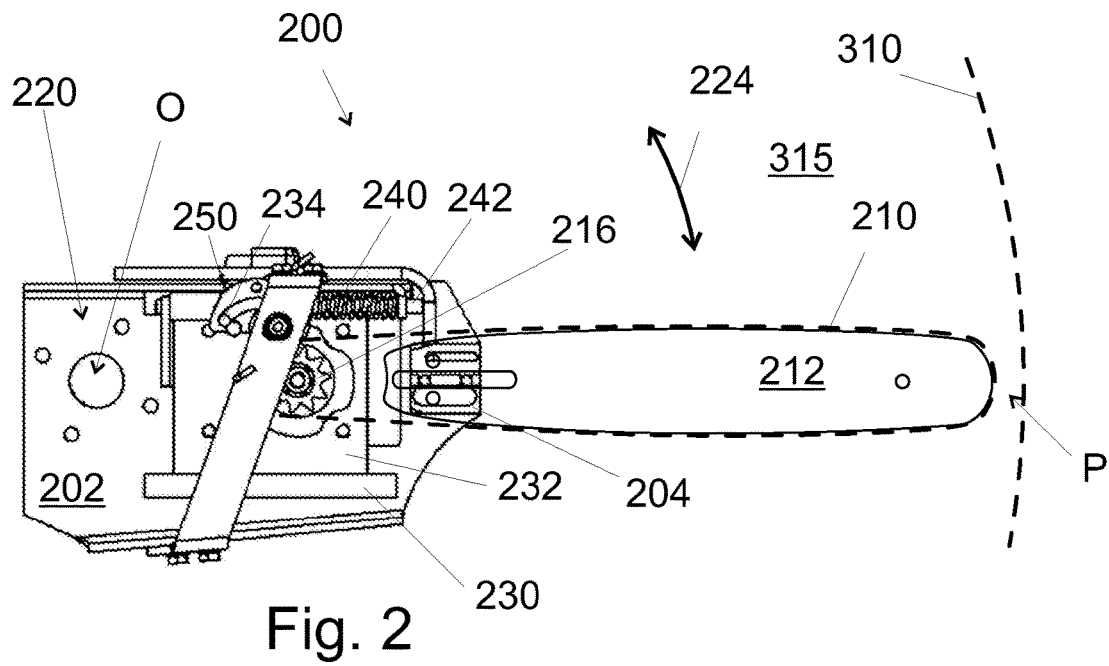
FIG. 2 shows a saw, a cutter flange and a saw chain according to an embodiment.
Figure 3:
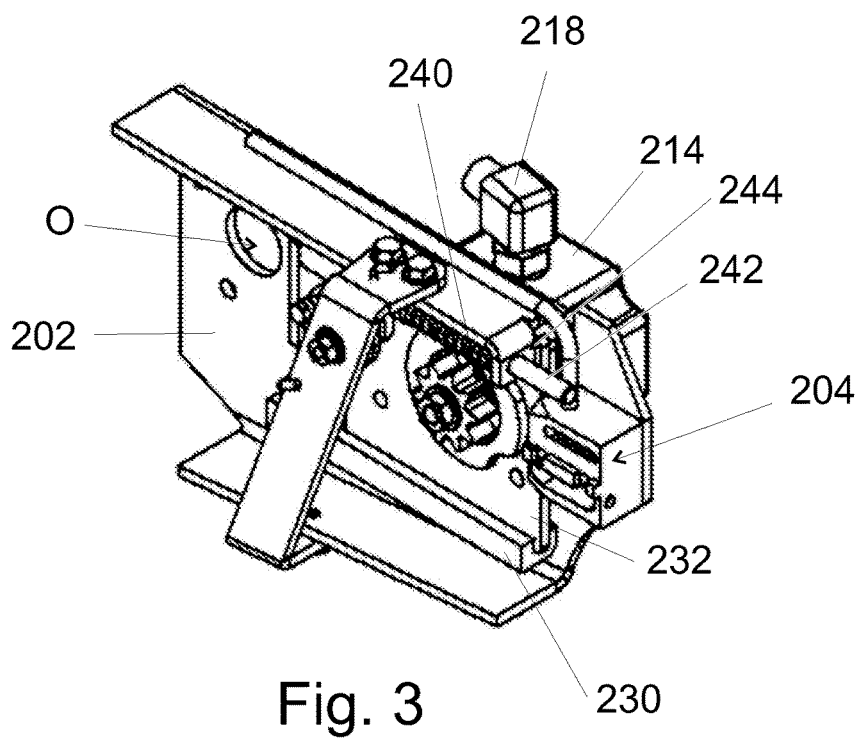
FIG. 3 shows a saw frame according to an embodiment in a perspective view.

The saw 200 of the firewood processor 100 is shown in more detail in, inter alia, FIGS. 2, 3, 5*a* and 5*b*. The saw 200 of the firewood processor 100 comprises (FIGS. 2 and 3)

a saw chain 210, which is shown in FIG. 2 by a dotted line 210, a sprocket 216, which is arranged to convey driving force to the saw chain 210, and a saw chain flange 212 for guiding the saw chain 210.

The connections of different parts to each other are shown later. The term "fixedly connected" means that the distance of the midpoints of pieces that are connected in such a way from each other remains constant during use. The parts may be removable from each other, for example, by opening a screw joint or a bolted joint. In normal use, however, said screw and/or bolt are closed and therefore the parts are fixedly connected to each other. The term "movably connected" means that the distance of the midpoints of pieces that are connected in such a way from each other is arranged to vary during use. The pieces may be in contact with each other, and therefore their distance as such may remain constant. For example, a piece connected to a rail may be movably connected. Similarly, a piece that swivels with respect to an axis is movably connected.

The flange 212 is fixedly connected to means 204 in order to connect the flange 212 to the frame 202 of the saw 200 and further, the saw 200 is entirely connected (movably) to the splitting machine 100.

The saw 200 comprises a sprocket 216, which is arranged to convey driving force from a motor 214 (see FIG. 3) to the saw chain 210 of the saw. The motor 214 may be arranged in the saw 200, or the driving force of the motor may be conveyed to the sprocket 216 from a motor 214 located elsewhere. Thus, the arrangement comprises means for conveying the force of the motor 214 to the sprocket 216. This type of means may comprise, for example, a belt or a chain. Typically the saw 200 comprises a motor 214 and the sprocket is directly connected to the axis of the motor 2114. The motor is arranged to produce at least the driving force of the saw 200.

The motor 214 shown in FIG. 3 is a hydraulic motor, where the motor 214 comprises an inlet 218 for transferring hydraulic fluid to the motor. Correspondingly, the motor 214 comprises an outlet for hydraulic fluid. It is obvious that also other motors, such as an electric motor or a combustion motor may be used as a motor 214 for the saw 200. An advantage of a hydraulic motor is its size, reliability and the fact that in firewood processors 100 the typically used splitting means 420 (FIG. 1*e*) is a splitting cylinder, which operates hydraulically, in which case hydraulic driving force is available.

Typically the saw 200 is used by turning the saw 200 in relation to the frame 110 of the splitting machine. This is implemented in an embodiment so that the splitting machine 100 comprises a rotation axis of a saw arranged in its frame 110 (not shown in the figures), and said saw 200 comprises means 220 for connecting the saw 200 into said rotation axis of the saw. In FIG. 2 said rotation axis would be located at point O. The firewood processor 100 further comprises means for turning the saw 200 in relation to said rotation axis of the saw. In FIG. 2 the arrow 224 illustrates the turning of the saw 200 when the rotation axis of the saw is at point O of the saw fastening means 220. Thus, the saw 200 is movably connected to the frame 110 of the firewood processor 100.

The saw 200 further comprises automatic means for tightening the saw chain 210, and for maintaining the tightness. When the saw chain is automatically at the suitable tightness, the above-described problems are reduced. Automatic means for tightening the saw chain 210 of said saw and for maintaining the tightness may comprise one or more of the following actuators: a hydraulic actuator; a mechanical actuator, such as a spring or flexible material; and an electromechanical actuator. A hydraulic actuator may comprise, for example, a hydraulic cylinder. An electromechanical actuator may comprise, for example, an electric magnet. A mechanical actuator may comprise a spring or flexible material. Hydraulic and electromechanical actuators are expensive, significantly more expensive than mechanical actuators. In addition, mechanical actuators are very reliable, since they do not require an outside power source. Because of this, advantageously the automatic means for tightening the saw chain 210 of said saw and for maintaining the tightness comprise a mechanical actuator or mechanical actuators. In an embodiment a firewood processor comprises automatic, mechanically operating means for tightening the saw chain 210 of said saw and for maintaining the tightness. This type of mechanical means comprise mechanical actuators or a mechanical actuator. In an embodiment the firewood processors comprises automatic, mechanically operating means for tightening the saw chain 210 of said saw and for maintaining the tightness, which automatic mechanical means comprise only mechanical actuators or a mechanical actuator.

In saws where the saw chain is tightened manually, it is known to tighten the chain by loosening the bolt joint of the flange, by pulling the flange outwards in a direction that is directed from the saw towards the tip of the saw cutter (direction from point O to point P, FIG. 2) and by tightening the flange into its place. This type of a procedure lengthens the saw somewhat. An alternative to the bolt joint is other openable fastening means, such as different quick-release fasteners.

In order to ensure work safety, the present splitting machine 100 advantageously comprises a cover 310 of the saw 200 (FIGS. 1a, 1b, 1c and 2). Thus, a protected space 315 remains between the saw cover 310 and the frame 110 of the splitting machine (FIGS. 1c and 2). Said saw 200 is arranged to saw said wood raw material in said protected space 315 (FIG. 1c).

Since the purpose is to completely cut the wood raw material with the saw 200, the saw cover 310 is arranged close to the cutter of the saw 200 (i.e. the saw chain 210), especially its tip P (FIG. 2). Thus no such space remains between the cutter 210 and the cover 310 where the wood raw material could be placed and not be sawn by the saw 200.

It has been discovered that it is advantageous to tighten the saw chain 210 of the saw 200 by moving at least the sprocket 216, which conveys force from the motor 214 to the saw chain 210. Thus, the total length of the saw 200 remains constant even though the cutter 210 is tightened. Correspondingly, the flange 212 remains in place in relation to the frame of the firewood processor 100. Especially the distance of the flange 212 from the saw cover 310 remains constant during tightening the cutter. For example, the flange 212 remains in place in relation to means 220 for connecting the saw 200 to the rest of the firewood processor 100, i.e. in relation to position O (FIG. 2). Since in this type of a solution the flange 212 does not move in relation to said saw rotation axis (for example position O, FIG. 2) when the saw chain 210 is tightened, the saw cover 310 may be installed very close to the saw cutter 210.

When moving the sprocket 216, which conveys force from the motor 214 to the saw chain 210, advantageously the motor 214 itself is simultaneously also moved, because advantageously the sprocket 216 is connected directly to the axis of the motor 214, as can be seen in FIGS. 2 and 3.

With reference to FIGS. 2 and 3 the means 220 mentioned in an embodiment for fastening the saw 200 to the saw rotation axis are arranged in a position O of the fastening means 220. In addition, said means for tightening the saw chain and for maintaining the tightness are arranged to move at least said sprocket 216 in relation to said position O of the fastening means 220.

Said means for tightening the saw chain and for maintaining the tightness are arranged to move said sprocket 216 in relation to said position O of the fastening means 220 in such a direction that the distance of the sprocket 216 from the end P on the side of the tip of the flange 212 increases. In an embodiment according to FIG. 2 both the sprocket 216 and the flange 212 are arranged in the same direction in relation to the fastening means 220. In this embodiment said automatic means for tightening the saw chain and for maintaining the tightness are arranged to move said sprocket 216 towards the fastening means 220 of the saw in order to tighten the saw chain. As will be shown later, the saw may comprise second means for loosening the saw chain for maintenance and/or removal of the saw chain.

Said sprocket 216 (and optionally also the motor 214) can be moved in relation to the position O of the fastening means 220, for example supported by a rail 230 or rails. With reference to FIG. 3, in an embodiment the saw 200 comprises a saw frame 202 and at least one rail 230 fixedly connected to the saw frame 202, by means of which rail at least the sprocket 216 of the saw motor 214 is arranged movable in relation to the saw frame 202. Thus, at least the sprocket 216 is movably connected to the frame 202 of the saw 200. The saw 200 in FIGS. 2 and 3 further comprises a base 232 movably connected to the rail 230, and the saw motor 214 is fixedly connected to said base 232. The base 232 can be, for example, a base plate. It is obvious that in FIG. 3 the sprocket 216 is connected directly to the saw motor 214, i.e. its axis. When in addition to the sprocket 216 also the motor 214 itself is connected to the motor base 232, the motor 214 heats its base 232 when running. This provides the advantage that also during winter the motor base 232 and the corresponding rail 230 remain unfrozen. Thus, the operation of the saw is ensured even in freezing temperatures. Motors generally (i.e. hydraulic motors, combustion motors and electric motors) release heat into their surroundings, such as the base 232, during use. In principle, it is possible to connect only a sprocket 216 using the cutter 210 to the base 232 and to convey force from the motor 214 indirectly, for example by means of a belt, a chain or sprockets to the sprocket 216 of the saw chain.

In FIGS. 2 and 3 the saw 200 comprises means 204 arranged in the saw frame 202 for fastening the flange 212 to the saw frame 202. Particularly noteworthy is that the means 204 for fastening the flange 212 are not fastened to the base 232 of the motor. Thus, the flange fastening means 204 are located in a fixed position in relation to the saw fastening means 220. Thus, also the firewood processor 100 comprises means 204 for fastening the flange 212 to the firewood processor 100.

Advantageously the flange 212 can be removed from the firewood processor 100, for example from the frame 202 of the saw 200. Thus, the saw chain 210 and/or the flange 212 are changeable. Advantageously the flange 212 can be removed without breaking or by disassembling as little of the firewood processor 100 or its saw 200 as possible. Advantageously the flange 212 of the saw chain can be removed from the firewood processor 100 without opening bolt joints. Advantageously the flange 212 of the saw chain can be removed from the firewood processor 100 by opening at least one quick-release fastening. In addition, advantageously the flange 212 of the saw chain can be removed from the firewood processor by opening 8 bolt joints and/or quick-release fastenings at the most. Thus, the saw chain 210 and/or the flange 212 can be easily changed by opening said quick-release fastening, said bolt joint, said quick-release fastenings, and/or said bolt joints.

FIGS. 2, 3, 5a and 5b illustrate an embodiment for automatic mechanically operating means for tightening a saw chain 210 and for maintaining the tightness. In the embodiments of the figures said automatic means for tightening the saw chain 210 and for maintaining the tightness comprise at least one spring 240. The spring 240 is advantageously a pressure spring. A pressure spring refers to a spring, which is in normal use somewhat compressed and therefore creates a push force. In the case of FIGS. 2 and 3 the push force is caused between the motor base 232 and the saw frame 202. Thus, the spring 240 pushes the motor base 232 towards the position O of the fastening means 220. Alternatively, or in addition, the saw 200 could comprise an extension spring, which would be arranged to pull the motor base 232 towards the saw fastening means 220. Alternatively, or in addition, this type of force could be directed to the motor base 232, for example, by a rotation spring, rotation springs or elastic material, such as elastomer. As mentioned above, other mechanical actuators could also, in principle, be used for generating force and for tightening the cutter. These are, however, typically expensive solutions. The use of a spring 240 or springs is advantageous, because on the one hand a spring 240 is an inexpensive and reliable solution, and on the other hand, it is quite simple to dimension the spring 240 in such a manner that the tightness of the saw chain 210 is suitable.

If the firewood processor 100, such as its saw 200, comprises a pressure spring 240 for tightening the saw chain 210 in the above-described manner, advantageously the saw 200 of the firewood processor comprises also a spring support 242. The spring support 242 is arranged to support the spring 240 in its place. In FIGS. 2 and 3 the spring support 242 is a pin 242, which is arranged to extend through the spring 240 in its longitudinal direction. By means of the pin 242 the spring 240 remains reliably in its place even in extensive compression. In FIGS. 2 and 3 the pin 242 is fixedly connected to the motor base 232. In FIGS. 2 and 3 the saw frame 202 further comprises a part, which limits the pin hole 244 fitted for the pin 242, in which case the pin 242 can move in its pin hole 244 when the motor base 232 moves in relation to the saw frame 202. Similarly it would be possible for the motor base 232 to comprise a part, which limits the pin hole 244 fitted for the pin 242, in which case the pin 242 could move in its pin hole 244 when the motor base 232 moves in relation to the saw frame 202. In this case the pin 242 would be fixedly connected to the saw frame 202.

FIGS. 2 and 3 show a spring, by means of which the saw chain 210 is tightened to a suitable tightness. As shown above, it is obvious that there may be several springs. More generally, if the firewood processor comprises a spring 240, the firewood processor inevitably comprises a spring assembly, which comprises at least one spring 240. In order to ensure the suitable tightness of the saw chain 210, the total spring constant of said spring assembly must be within a suitable area. In an advantageous embodiment the total spring constant of the spring assembly formed by said at least one spring 240 is between 1 N/mm and 10 N/mm; advantageously 3 N/mm to 5 N/mm; and most advantageously 3.5 N/mm to 4.5 N/mm. The total spring constant may be calculated, in a manner known as such, from the spring constants of individual springs 240 that are connected in parallel or in series Great enough changes in length from the point of view of stretching the saw chain should be achieved with this kind of spring assembly. In addition, a long enough spring travel is necessary, for example, in such solutions, where the saw chain 210 can be changed without the flange 212 being removed from the saw frame 202. Advantageously the longest spring travel of the spring assembly formed by said at least one spring 240 is at least 20 mm; advantageously at least 40 mm; and most advantageously at least 50 mm. It may be that a spring travel of 20 mm is not enough from the point of view of changeability of the saw chain 210—without moving the flange 212. The flange 212 may be manually movable in a conventional manner—by opening attaching bolts or a quick-release fastener—in order to change the saw chain 210. The length of the springs 240 (or spring 240) used in the spring assembly defines the upper limit of the longest spring travel. Advantageously the longest spring travel is at most 100 mm or at most 80 mm.

Figures 4, 7:
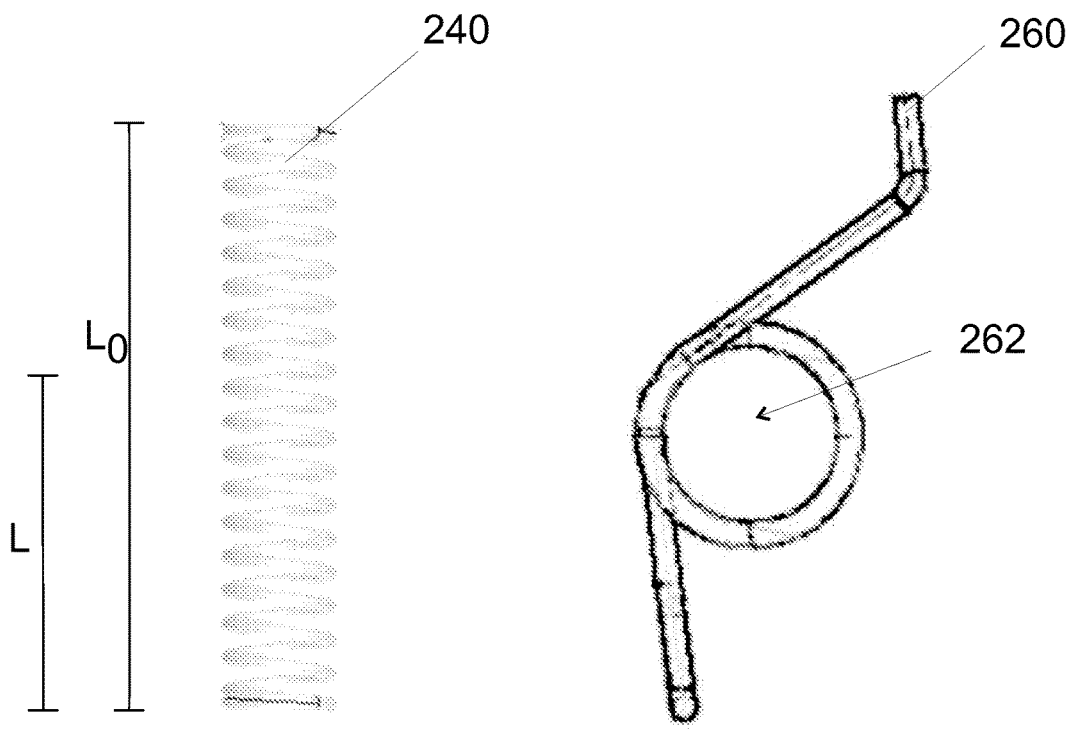
FIG. 4 shows a pressure spring.
FIG. 7 shows a torsional spring.

In FIGS. 2 and 3 said spring assembly comprises only one spring 240. This type of a spring is shown in FIG. 4. In this case the longest spring travel of the spring and the spring constant may be, for example, within the above-mentioned limits relating to spring assembly. In addition, the length of the spring 240 when unloaded, $L_0$, may be, for example, between 60 mm and 200 mm, such as 80 mm to 150 mm, for example approximately 100 mm (at the accuracy of two digits). The longest spring travel of the spring 240 (or spring assembly) refers to the difference $L_0-L$ between the unloaded length $L_0$ and loaded length L when the spring 240 is compressed into its extreme position.

Figure 5A:
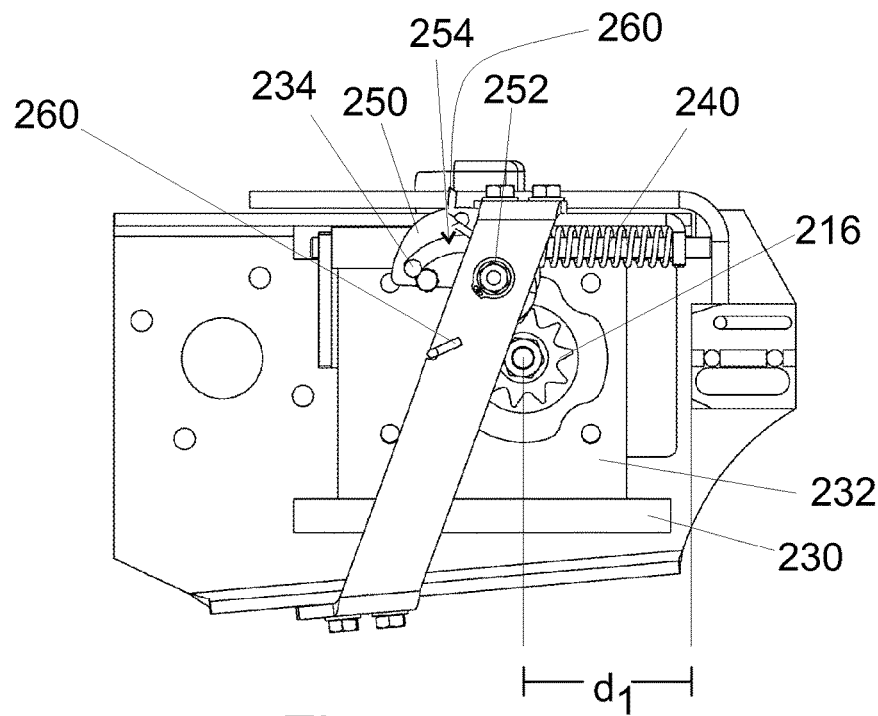
FIG. 5a shows a saw frame according to an embodiment in a side view when the cutter is tight; the cutter and the flange are not shown.
Figure 5B:
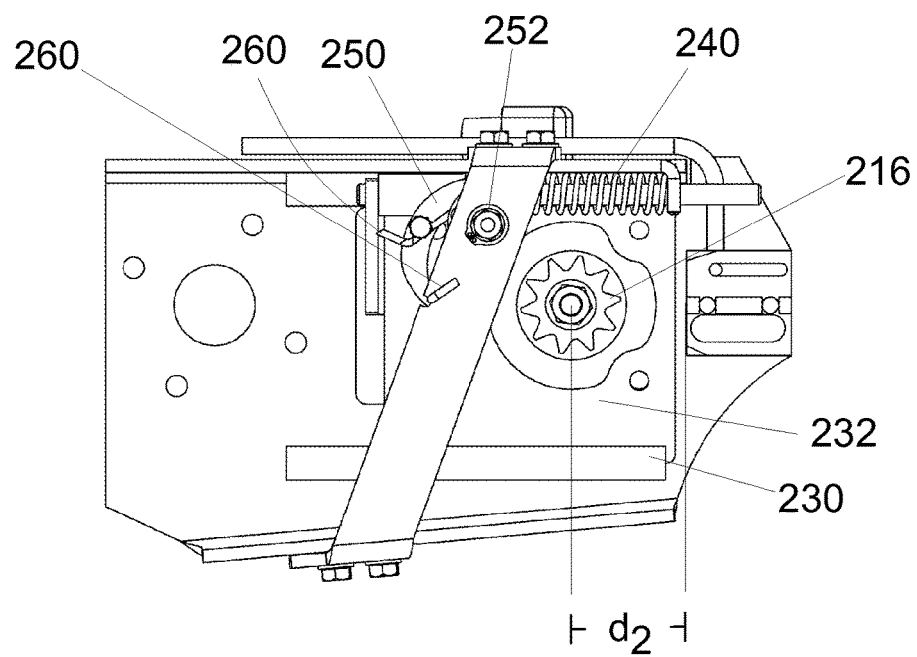
FIG. 5b shows a saw frame according to an embodiment in a side view when the cutter is loose; the cutter and the flange are not shown.

From the point of view of changing and/or maintenance, such as sharpening, of the saw chain 210 it is advantageous that the saw chain 210 can also be loosened. In this type of an embodiment the saw 200 of the splitting machine 100 further comprises second means for loosening the saw chain 210. This is achieved by a mechanism, which can be used to move said automatic means for tightening the saw chain and for maintaining the tightness in such a manner that the saw chain 210 loosens. Thus, the sprocket 216 is moved in the opposite direction than when tightening the cutter 210. With reference to FIGS. 5a and 5b, this type of a mechanism may, for example, compress a spring 240. Advantageously this type of a mechanism can be reversed, in which case said second means for loosening the saw chain 210 are also second means for tightening the saw chain 210.

In an embodiment said second means for loosening the saw chain 210 (and optionally for tightening as well) comprise a wobbler 250, by means of which said saw motor sprocket 216 may be moved in relation to said saw chain flange 212. In such an embodiment, where the sprocket 216 (and possibly also the motor 214) are connected to a base 232, said base 232 may be moved in relation to said saw chain flange by means of the second means. In such an embodiment where further the saw 200 of the splitting machine 100 comprises means 220 for connecting the saw 200 to the saw rotation axis, by means of the second means the motor base 232 may be moved in relation to said position O of the fastening means 220. In an embodiment said automatic means for loosening the saw chain 210 are arranged to move at least said sprocket 216 in relation to said position O of the connecting means 22.

Figure 6:
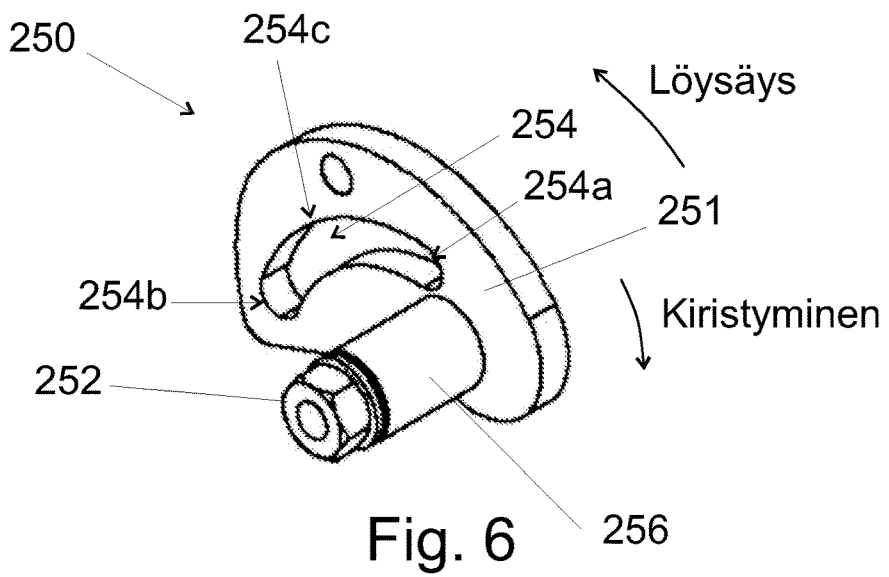
FIG. 6 shows a wobbler in a perspective view.

The wobbler 250 is shown more in detail in FIG. 6. The wobbler 250 comprises a frame 251 and an axis 256. The wobbler 250 comprises means 252 for turning the wobbler 250 in relation to its axis 256. In FIG. 6 these means 252 comprise a nut 252. The wobbler 250 comprises a slot 254 in its frame 251. The slot 254 has two ends 254a and 254b and an inner edge 254c. These ends and the inner edge together with the pin 234 of the motor base 232 (FIGS. 2 and 5a) define, on the one hand, the movement of the wobbler 250 and, on the other hand, the movement of the motor base 232.

To correspond with the slot 254 of the wobbler 250, a pin 234 is arranged in the motor base 232 (FIGS. 2 and 5a). The pin 234 is fixedly connected to the motor base 232 and arranged in the slot 254 of the wobbler. The pin 234 can move only in one direction; in the direction determined by the rail 230. Therefore, in this direction the location of the slot 254 of the wobbler, i.e. the position of the slot hole specifically in this direction, is determined firstly by the shape of the slot 254 and secondly by the position of the wobbler 250.

The wobbler 250 is formed in such a manner that the distance of the inner edge 254c of the slot from the axis 256 increases when moving in a direction that is perpendicular to the directions of the axis 256 and the axis 256 radius. In FIG. 6 the wobbler 250 is shaped in such a manner that the distance of the inner edge 254c increases when moving counterclockwise in a direction that is perpendicular to the directions of the axis 256 and the axis 256 radius, when viewing the directions from the nut 252 towards the frame 251. The saw 200 comprises a pin 234 in the base 232 of the motor 214 (FIGS. 5a and 5b).

When the above-mentioned means for tightening the saw chain 210 and for maintaining the tightness tighten the saw chain, the wobbler 250 turns to a position determined by the length of the saw chain 210, the pin 234 and the slot 254. If the saw chain 210 has been loose, the wobbler 250 turns clockwise, as illustrated with the arrow "tightening" in FIG. 6.

When the saw chain 210 is loosened by means of the wobbler 250, it takes place by turning the wobbler 250 counterclockwise (FIG. 6; arrow "loosening"). Thus, the pin 234 is supported against the inner edge 254c of the slot 254 of the wobbler 250. When turning the wobbler 250, said inner edge 254c, at that point where the pin 243 is, moves towards the axis 256 (see FIG. 6). Thus, when moving, the pin 234 moves the base 232, as well as the sprocket 216 and thus loosens the saw chain 210.

By means of the wobbler 250 (i) the sprocket 216 can be moved in relation to the saw chain flange 212 for a distance, (ii) the sprocket can be moved in relation to the position O of the fastening means 220 for a distance, (iii) the base 232 can be moved in relation to said saw chain flange for a distance, or (iv) the base 232 can be moved in relation to said position O of the fastening means 220 for a distance; wherein said distance is advantageously at least 15 mm, more advantageously at least 20 mm and most advantageously at least 30 mm. Thus, changing the cutter 210 becomes easier. The design of the wobbler can affect the length of said distance. For example, this distance is affected by the distance of the first end 254a of the slot 254 from the axis 256 and the distance of the second end 254b of the slot 254 from the axis 256. The greater the difference between these distances (by its absolute value), the more the cutter 210 may be loosened by turning the wobbler 250.

When the wobbler 250 is no longer turned, the wobbler 250 turns to a position determined by the length of the saw chain 210, the pin 234 and the slot 254, clockwise by the effect of the spring 240.

Advantageously the slot 254 of the wobbler 250 is arranged in relation to the axis 256 of the wobbler 250 on that side where the force of the spring 240 towards the base 232 is directed. Thus, the operation of the wobbler 250 is more stable than if the slot were arranged on the other side of the axis 256.

It is obvious that the slot 254 of the wobbler 250 could also be shaped in such a manner that loosening of the cutter would take place by turning clockwise and in connection with tightening the wobbler would turn counterclockwise.

The spring force of the spring 240 is not necessarily enough in all situations to turn the wobbler. In an embodiment the second means of the saw 200 for loosening the saw chain further comprise a torsional spring 260 for turning the wobbler 250 and for tightening the saw chain 210. The torsional spring 260 may be from one end supported to the frame of the saw 200 in accordance with FIGS. 5a and 5b and from the other end supported to the wobbler 250 in accordance with FIGS. 5a and 5b. In addition, the torsional spring 260 may be arranged, for example, around the axis 256 of the wobbler 250 and arranged to return the position of the wobbler 250. The torsional spring may, for example, surround a channel 262 for the axis 256 of the wobbler, which channel 262 and axis 256 are fitted to each other. The spring constant of the torsional spring 260 may be, for example, 5 to 200 times the spring constant of the spring 240 (or a corresponding spring assembly). The spring constant of the torsional spring 260 may be, for example, between 50 N/mm and 1000 N/mm, advantageously between 100 N/mm and 4000 N/mm, and most advantageously between 190 N/mm and 250 N/mm. When the torsional spring 260 turns the wobbler 250, also the torsional spring 260 tightens the cutter 210 of the saw 200. Therefore, the torsional spring 260 and the pressure spring 240 may together be dimensioned so that the spring constant of the spring assembly is within the above-mentioned limits.

In an embodiment the means 252 for turning the wobbler 250 comprise a lever, by means of which the saw chain 210 may be loosened by turning the wobbler 250 without separate tools. It is obvious that for turning only the nut 252, a corresponding tool is needed.

When using the saw 200 of the firewood processor 100 for sawing wood a force is directed to the saw chain 210 due to the sprocket 216 and said wood, which force tenses the saw chain 210. Thus, the tensioned saw chain may pull the sprocket 216 towards the point P of the flange 212 of the cutter (FIG. 2). Thus, the saw chain 210 may temporarily loosen.

In order to prevent this, in an embodiment (not shown in the figures) the firewood processor 100 or its saw 200 comprises means for locking of the sprocket 216 in relation to the flange 212 of the cutter at least in one direction at least during sawing. Thus, said means have the effect that the saw sprocket 216 cannot move towards the flange 212 of the cutter, in which case the above-described temporary loosening is prevented. Thus, the movement of the sprocket 216 at least towards the flange 212 at least during sawing is prevented. It may be that all the movement of the sprocket 216 towards the flange 212 at least during sawing is prevented.

For example, the saw 200 of the firewood processor may comprise means for locking of the sprocket 216 in relation to the position O of the saw fastening means 220 at least in one direction at least during sawing. For example, said means may lock the sprocket 216 in relation to the rail 230; at least in one direction and at least during sawing.

Said means can advantageously be opened because when the saw chain is changed, the saw chain is loosened. Also from the point of view of installing a new saw chain, the openability of said means is advantageous.

The locking may be onedirectional. Thus, the locking does not necessarily need to be opened between sawings. A onedirectional locking may be created by means of, for example, a cogged piece 300, 310 (FIGS. 8*a* and 8*b*) and a flexible latch 320.

Figure 8A:
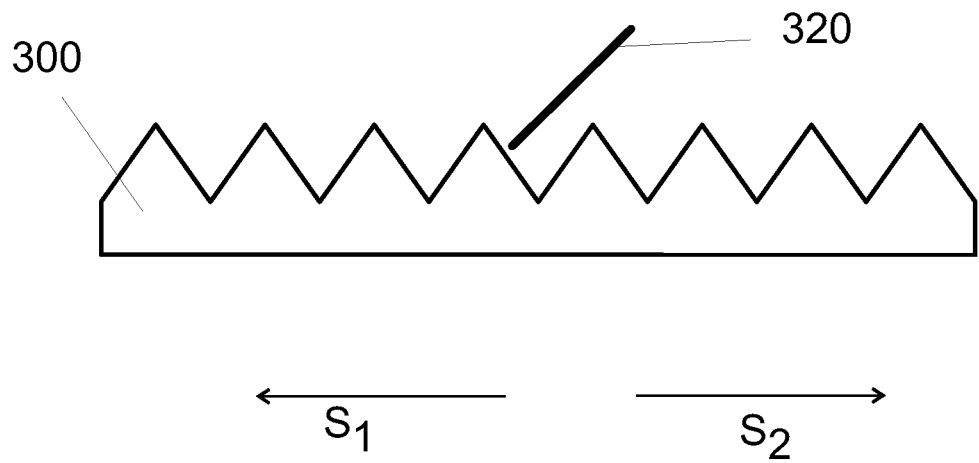
FIG. 8a shows means, which can be used to lock the position of the sprocket in relation to the flange, in at least one direction at least for the duration of sawing.

For example, in FIG. 8*a* a cogged bar 300 can move in direction $S_1$ in relation to the flexible latch 320. Correspondingly, the position of the cogged bar 300 is in one direction locked in relation to the latch 320, because the latch 320 prevents the movement of the cogged bar in direction $S_2$.

If the onedirectional locking needs to be opened, for example when changing the saw chain 210, the locking can be opened by, for example, lifting the latch 320, in which case a cog of the cogged bar 300 is not supported by the latch 320.

For example the base 232 (see FIG. 2) could comprise a cogged piece according to FIG. 8*a*, by means of which the base 232 could be onedirectionally locked, for example, in relation to the rail 230. Thus, the base could move without opening the bolt only in such a direction that lengthens the length of the necessary saw chain (i.e. tightens the saw chain 210). In the above-described sawing situation the movement of the sprocket 216 in the other direction is prevented. Thus, also the temporary loosening of the saw chain is prevented in said situation.

Figure 8B:
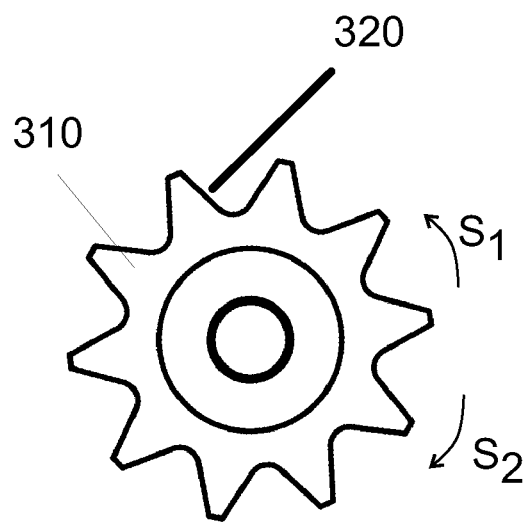
FIG. 8b shows means, which can be used to lock the position of the sprocket in relation to the flange, in at least one direction at least for the duration of sawing; and
In FIGS. 1 to 8, corresponding numerals or symbols refer to corresponding parts.

The cogging may also be arranged in the sprocket 310 according to FIG. 8*b*. Thus, the latch 320 prevents the sprocket 310 from turning in one direction, but allows it to turn in another direction. In FIG. 8*b* the turning is possible in direction $S_1$ and prevented in direction $S_2$.

For example, on the outer edge of the wobbler 250 could be arranged a cogging in such a manner that the wobbler 250 could turn only in one direction without opening the latch 320. Thus, the base could move without opening the bolt only in such a direction, which is allowed by the wobbler cogging together with the bolt. Said direction would be such that lengthens the length of the necessary saw chain (i.e. tightens the saw chain 210). Thus, in the above-described sawing situation the movement of the sprocket 216 in the other direction is prevented. Thus, also the temporary loosening of the saw chain is prevented in said situation.

It is also possible to lock the sprocket 216 during sawing to be fixed in all directions in relation to the cutter flange 212. For example, it is possible during sawing to lock the sprocket 216 to be fixed in all directions in relation to the position O of the saw fastening means 220, such as in relation to the rail 230, if the saw 200 comprises a rail 230. Thus, after the sawing, by opening the locking, the above-presented automatic means for tightening said saw chain 210 of the saw and for maintaining the tightness tighten the saw chain 210 into a suitable tightness. During sawing said locking prevents the movement of the sprocket 216 (and the temporary loosening of the saw chain) in the above-described sawing situation.

The invention claimed is:

1. A firewood processor with a tightenable saw chain, which comprises
    a frame, which is arranged to support the firewood processor to a base,
    a saw for sawing wood raw material in a transverse direction into an intermediate product of a desired length, which saw comprises
        a saw chain
        a flange for guiding said saw chain and
        a sprocket, which is arranged to convey driving force to said saw chain,
    a saw frame,
    a rail fixedly connected to the saw frame,
    a motor such that the sprocket is connected directly to an axis of the motor,
    a base movably connected to said rail such that said sprocket and said motor are fixedly connected to said base,
    a splitting section for splitting the intermediate product in a longitudinal direction into a desired size, which splitting section comprises
        a splitting wedge, and
        a pusher for pushing the intermediate product of a desired length towards the splitting wedge or for pushing the splitting wedge towards said intermediate product,
    an automatic saw chain tightener for tightening the saw chain of said saw and for maintaining the tightness.

2. The firewood processor according to claim 1, wherein said automatic saw chain tightener for tightening the saw chain of said saw and for maintaining the tightness comprises at least a mechanical actuator for tightening the saw chain of the saw and for maintaining the tightness.

3. The firewood processor according to claim 1, comprising
    a saw cover, wherein a protected space remains between said frame of the firewood processor and the saw cover, and
    said saw is arranged to saw said wood raw material in said protected space.

4. The firewood processor according to claim 1, wherein said saw comprises a plate for fastening the saw to a saw rotation axis, which
    plate for fastening the saw is arranged in a position,
    wherein,
    said automatic saw chain tightener for tightening the saw chain of the saw and for maintaining the tightness are arranged to move said sprocket in relation to said position.

5. The firewood processor according to claim 1, wherein said automatic saw chain tightener for tightening the saw chain of the saw and for maintaining the tightness comprises at least one spring.

6. The firewood processor according to claim 5, wherein a total spring constant of a spring assembly formed by said at least one spring is between 1 N/mm and 10 N/mm and/or the longest spring travel of the spring assembly formed by said at least one spring is at least 20 mm.

7. The firewood processor according to claim 1, comprising
a loosening apparatus for loosening the saw chain.

8. The firewood processor according to claim 7, wherein
said saw comprises a plate for fastening the saw to the saw rotation axis, which
plate for fastening the saw is arranged in a position, wherein
said loosening apparatus for loosening the saw chain is arranged to move said sprocket in relation to said to position.

9. The firewood processor according to claim 7, wherein
the loosening apparatus for loosening the saw chain comprises a wobbler, by means of which it is possible to move said sprocket in relation to said saw chain flange.

10. The firewood processor according to claim 9, wherein
the loosening apparatus for loosening the saw chain further comprises a torsional spring for turning the wobbler and for tightening the saw chain.

11. The firewood processor according to claim 1, comprising
a locking apparatus for locking of the sprocket in relation to the flange at least in one direction at least during sawing, wherein at least some of the movement of the sprocket at least towards the flange at least during sawing is prevented.

12. The firewood processor according to claim 1, wherein
the saw chain flange can be removed from the firewood process.

\* \* \* \* \*